Aug. 28, 1962   E. W. CRESSMAN ET AL   3,050,836
APPARATUS FOR STRIPPING MOLDED ARTICLES FROM CORE PINS
Filed May 27, 1960   4 Sheets-Sheet 1
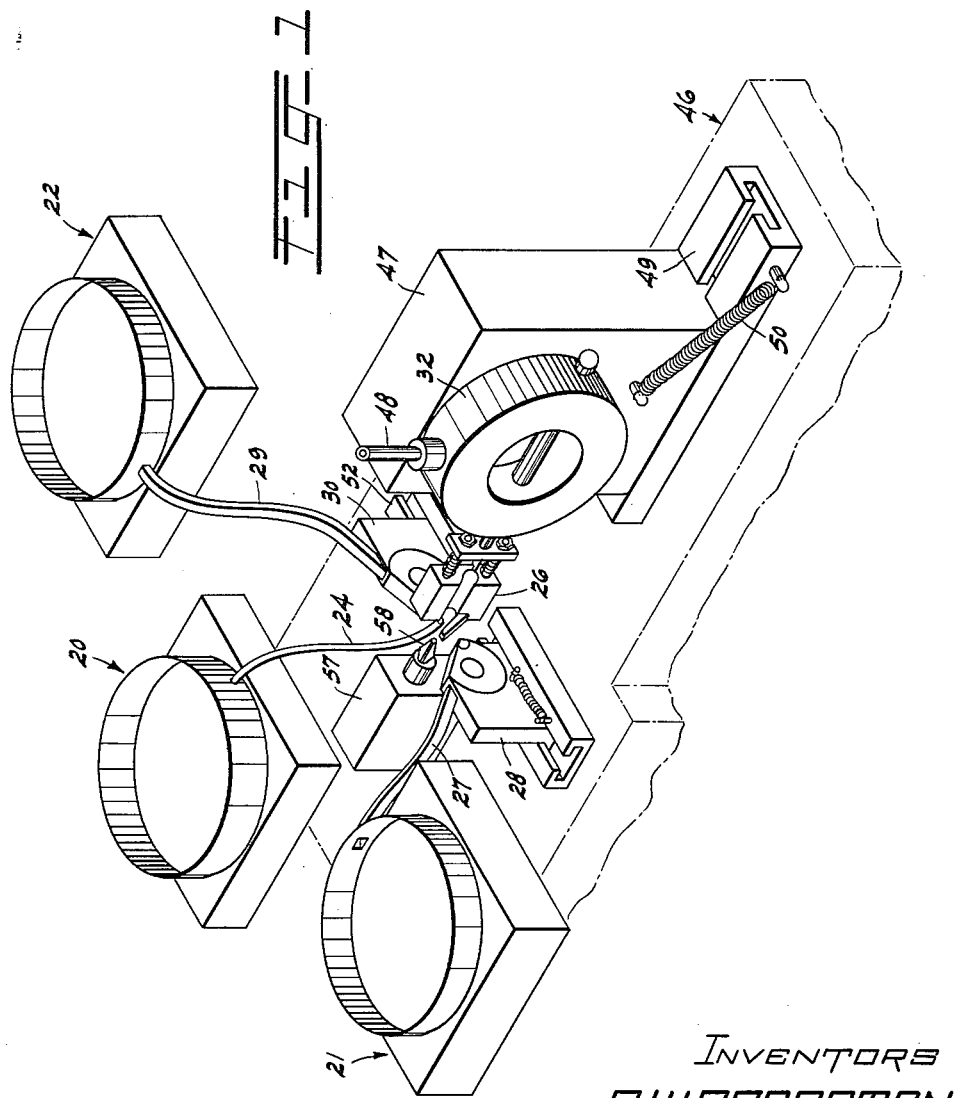
INVENTORS
E.W. CRESSMAN
A.P. JURNAK
R.L. MUELLER
By
ATTORNEY

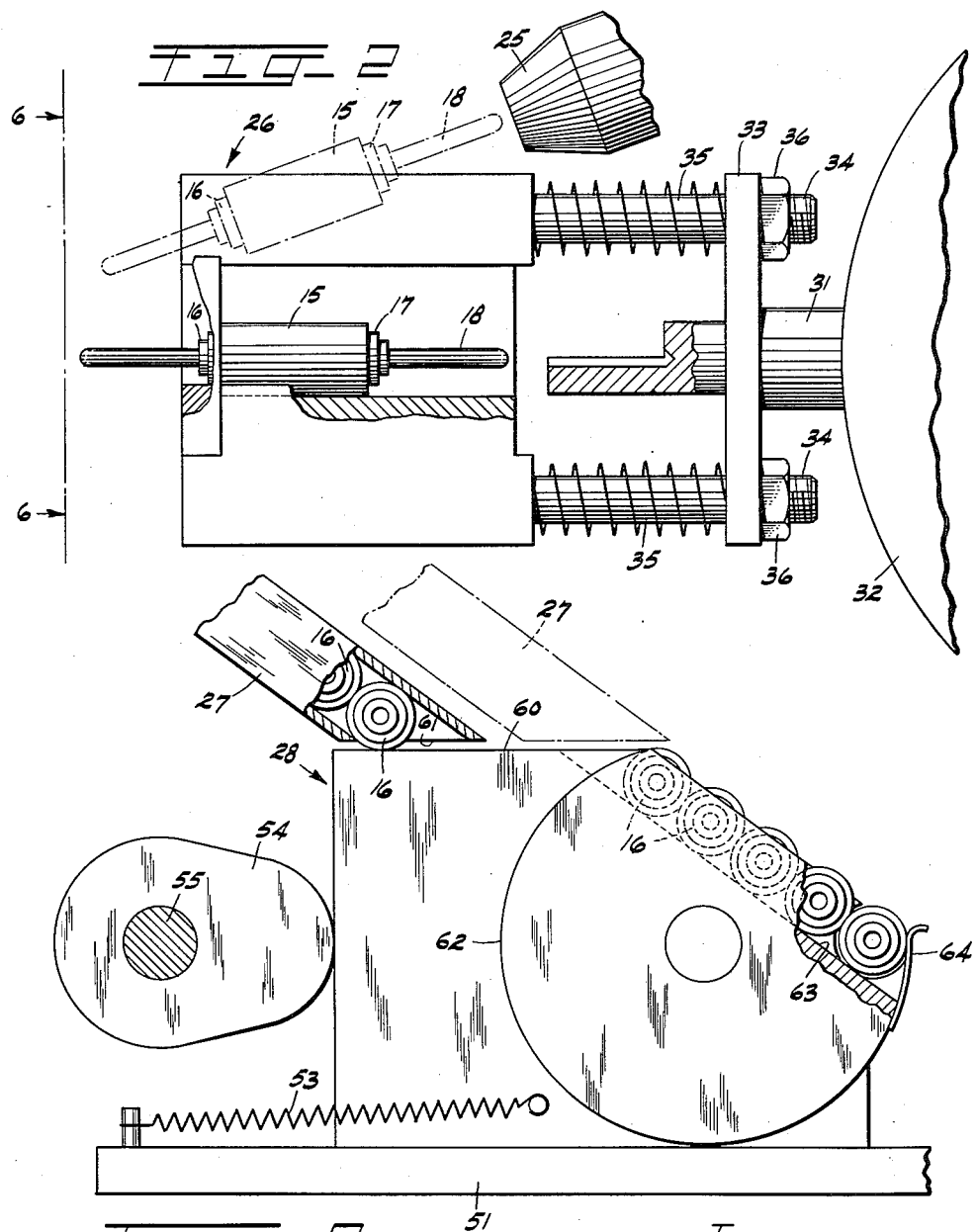

INVENTORS
E. W. CRESSMAN
A. P. JURNAK
R. L. MUELLER
By
ATTORNEY

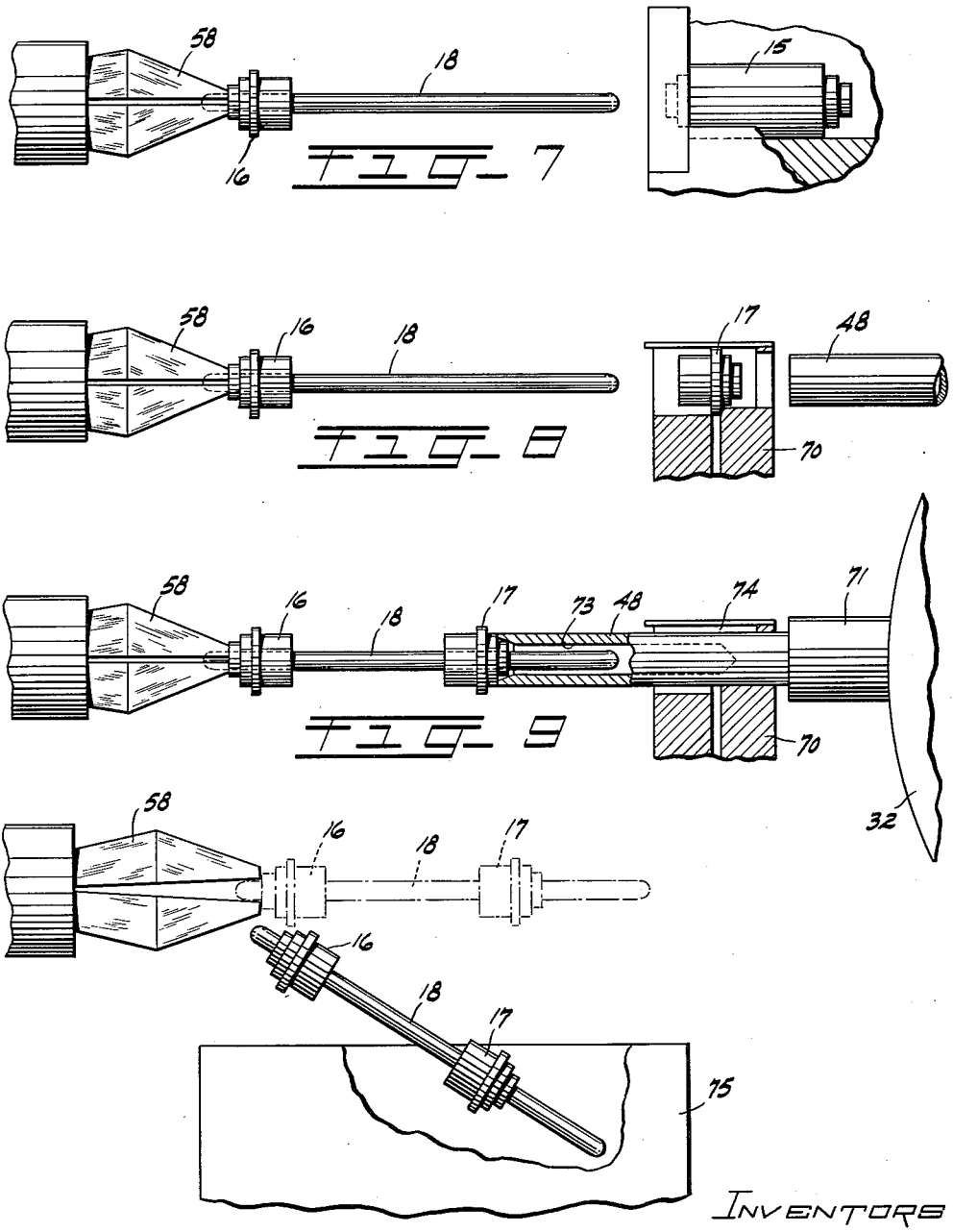

United States Patent Office 3,050,836
Patented Aug. 28, 1962

3,050,836
APPARATUS FOR STRIPPING MOLDED
ARTICLES FROM CORE PINS
Earl W. Cressman, Sellersville, Andrew P. Jurnak, Coopersburg, and Ralph L. Mueller, Emmaus, Pa., assignors to Western Electric Company, Incorporated, New York, N.Y., a corporation of New York
Filed May 27, 1960, Ser. No. 32,224
7 Claims. (Cl. 29—208)

This invention relates to apparatus for forming articles, particularly apparatus for stripping molded articles from core pins and reloading the core pins with hollow parts for molding of articles including the parts on the core pins.

In the manufacture of a given type of germanium point contact varistor sleeve assembly, sleeve-like parts are to be molded in the ends of germanium varistors. To produce a saitsfactory component, a hollow molded article with sleeve-like parts, partially imbedded in the ends thereof, with the apertures of the sleeve-like parts and the molded article having aligned centers, a core pin, in each instance, is utilized to support the sleeve-like parts relative to each other during the molding of the article on the core pin. Therefore, it has been determined that a series of processing steps are essential in molding articles of this type. Initially, the sleeve-like parts must be mounted individually on opposite ends of each core pin, after which the article is molded including portions of the sleeve-like parts. This action is followed by the removal of the molded article with its sleeve-like parts from the core pin and the conditioning of the core pin for the next molding cycle by the mounting of a new pair of sleeve-like parts on opposite ends thereof.

An object of the present invention is an apparatus for carrying out certain of the processing steps including the removal of the finished article from a core pin and the mounting of parts thereon for a subsequent molding operation.

In accordance with the object, an apparatus is provided for stripping molded articles from core pins and reloading the core pins with hollow parts for molding of articles including the parts on the core pins. In the present instance, the apparatus includes the holder adapted to receive successive mounted articles on core pins, a carriage to support the holder reciprocable in a given line between a normal position and a loading position where means to feed the molded articles on their core pins is operated singly to feed the articles to the holder in the loading position. Also, means is provided to feed a first part to one end of the core pin in the holder after which a collet is actuated to grip said one end of the core pin to cause removal of the article from the core after which means is operated to load a second part on the other end of the core pin.

More specifically, the apparatus in the present instance is a modification of an automatic screw machine wherein certain of the units of the machine are employed, modified for this particular purpose and the mechanical motions through conventional and new cams are utilized to move units of the present apparatus between their normal positions and their loading positions in a particular order to bring about a series of actions which include feeding of finished articles on core pins singly to a holder, forcing a hollow part on one end of the core pin, feeding said end of the core pin to a collet where it is gripped and held while the holder returning to its normal position removes its finished article from the core pin, after which another hollow part is forced onto the other end of the core pin and the core pin with the hollow parts on opposite ends thereof ejected from the collet.

Other objects and advantages will be apparent from the following detailed description when considered in conjunction with the accompanying drawings wherein:

FIG. 1 is a schematic isometric view of the apparatus;

FIG. 2 is a detailed view of the holder illustrating the feeding of a finished article on a core pin fed thereto;

FIG. 3 is a side elevational view of one of the feeding units for the parts;

FIG. 7 is a fragmentary detailed view illustrating the removal of the finished article from the core pin while the core pin is held by the collet;

FIGS. 8 and 9 are views illustrating the mounting of the second hollow part on the other end of the core pin; and FIG. 10 illustrates the ejection of the core pin and hollow parts from the collet.

Figure 4:
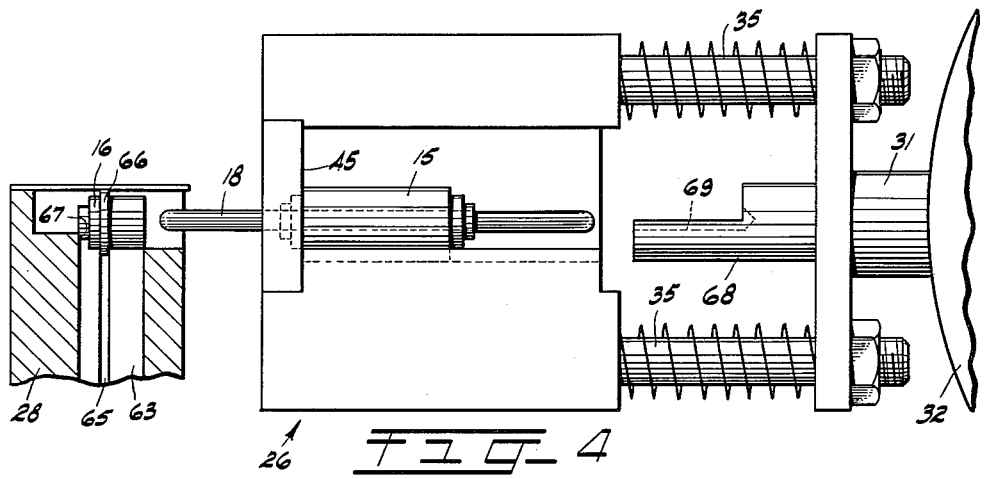
FIG. 4 is a detailed view of the holder and a portion of a front feeding unit positioning a hollow part about to be mounted on an adjacent end of the core pin.

The purpose of the apparatus is to receive successive finished articles 15 which, in the present instance, are molded germanium varistors with their hollow or sleeve-like parts 16 and 17. At this point, the finished articles are located on core pins 18 which are utilized in the molding of the article and the holding of the parts 16 and 17 in their proper positions for the molding operation and particularly for their inclusion in the finished articles. In further describing the function of the apparatus in order that its detailed structure may be more clearly understood, a new part 16 (FIG. 4) is to be forced onto one end of the core pin 18, after which the finished article 15 is removed and the other part 17 is mounted on the core pin.

In FIG. 1, the apparatus is illustrated as having a vertical feed unit 20, a front feed unit 21, and a back feed unit 22. The upper structures of these units may be of the commercially known vibrating types of feed units causing the finished articles 15 and their core pins in unit 20 to advance singly down a chute 24 to suitable means 25 adapted to eject the finished articles and their core pins singly into a holder 26 (FIG. 2). The front feed unit 21 causes feeding of hollow parts 16 in a given oriented position successively down a chute 27 to its slide 28, while the unit 22 feeds the parts 17 in predetermined oriented positions down a chute 29 to its slide 30.

Figure 6:
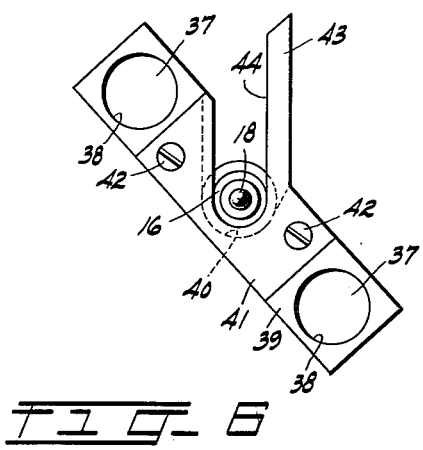
FIG. 6 is an end elevational view of the holder, this view being taken along the line 6—6 of FIG. 2.

The holder 26 has a mounting lug 31 disposed in an aperture of a turret 32 and secured therein. The lug 31 has a head 33 with threaded ends 34 of rods 35 mounted therein and secured in place by nuts 36. The rods 35 have piston-like heads 37 disposed in apertures 38 of the main body 39 of the holder 26. The holder 26 is tilted at an angle, as shown in FIG. 6, so that a central hollow portion 40 of the body 39 is adapted to receive and support the finished article 15 with its core pin 18. An end member 41 fixed at 42 to the central portion of the body 39 has a vertical projection 43 providing one side of a vertical opening 44 to receive one end of the core pin 18, an adjacent portion of the hollow part 16, but not to include the remaining end of the article 15. As a result, the inner surface 45 serves as a shoulder against which the molded article rests.

The turret 32, in the present instance, is the tool supporting turret, a part of the main structure of an automatic screw machine, indicated generally at 46, and mounted for rotary movement on a drive unit 47. The drive unit has been modified only to control the indexing of the turret 32 to keep the holder 26 in the operating position, shown in FIG. 1, for a number of operating cycles prior to indexing the turret for locating a mounting tool 48 in operating position. Furthermore, the unit 47 is in the form of a slide or carriage mounted on a guide 49 urged into its normal position by a spring 50 and moved by the conventional means, not shown, into the operating or loading position shown in FIG. 1.

The units 28 and 30 are similar in general structure in that they are in the form of slides mounted for movement on guides 51 and 52 and urged toward their normal positions by springs such as spring 53, shown in FIG. 3. Furthermore, suitable cam means embodied in the machine 46 or any other suitable means such as a cam 54 mounted on a cam shaft 55 may be employed to move the units from their normal positions into their loading positions at predetermined timed intervals during operation of the unit 47 for the operating cycles of the holder 26 and the tool 48. Another unit 57 in the form of a slide movable by similar means, employed for moving the other units 28, 30, and 47, from its normal position to its operating or loading position, may include the cam operating means of the machine 46 together with other means disposed in the unit for opening and closing its collet 58.

The unit 28, as illustrated in FIGS. 1, 3, and 4 in the present illustration, has an upper surface 60 adapted to close an outlet opening 61 of the chute 27 when the unit 28 is moved to the loading position shown to stop advancement of the parts 16 during this action of the unit. The unit 28 also has a substantially circular member 62 with an angularly positioned groove 63 open at its upper end for alignment with its outlet 61 of the chute 27, when in its normal position, so that the groove may be filled with the parts 16, the lower end of the groove being closed by a resilient member 64. In the present instance, the groove 63 is provided with a narrow portion 65 for receiving a flange portion 66 of each part 16 serving with a back portion 67 of the groove 63 to support the lowermost parts 16 during movement of the holder 26 to force the leading end of the core pin 18 into the part 16.

Figure 5:
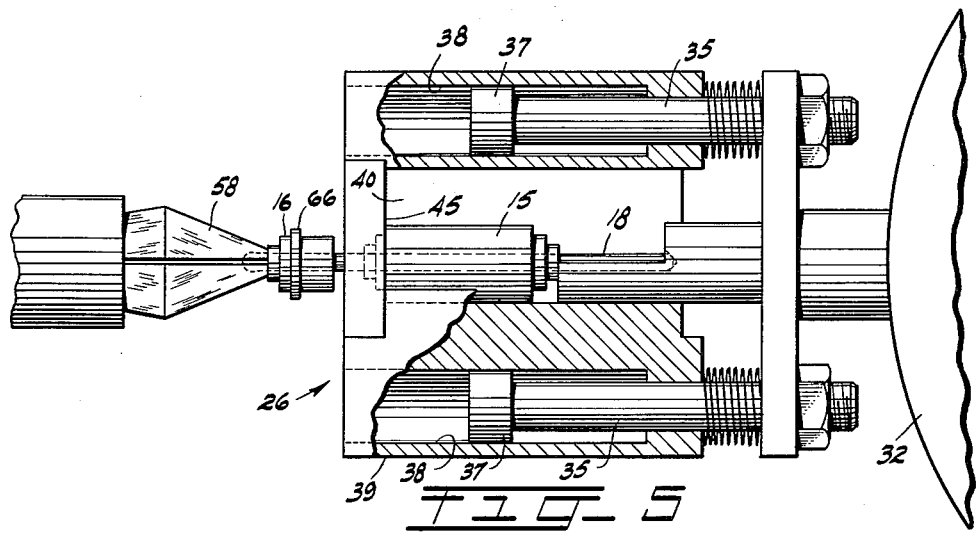
FIG. 5 is a detailed view of the holder illustrating the mounting of one end of the core pin in a collet.

A projection 68 of the lug 31, formed as shown in FIGS. 2, 4, and 5, serves to engage the right end of the core pin 18, it being provided with a recess 69 to receive the core pin to force the core pin into the part 16 held in the unit 28.

During a later cycle of operation of the unit 47 with the holder 26, the leading end of the core pin 18 is fed into the collet 58 while the collet is open, after which the collet is closed to firmly grip its respective end of the core pin and hold it with the part 16 mounted thereon during a return movement of the unit 47 with the turret 33 and the holder 26 to remove the finished article 15 from the core pin. The remaining structure, including the core pin 18 and the mounted part 16 is now held in the collet, as illustrated in FIG. 7. At this time, the unit 30 is moved into the loading position locating, as illustrated in FIG. 3, a part 17 in a member 70 of the unit 30 in alignment with the core pin and the tool 48 which has been indexed into position by the turret 32, as shown in FIG. 7. During the next forward motion of the carriage or unit 47, the tool 48 mounted at 71 in the turret 32 and hollow, as shown at 73, is moved through the adjacent portion 74 of the member 70 to force the hollow part 17 into a predetermined position on the core pin 18. Following the return of the tool 48 to its normal position, the collet 58 is opened, as illustrated in FIG. 10, and the core pin 18 with its parts 16 and 17 mounted thereon is freed to drop into a receptacle 75.

*Operation*

During the operation of the apparatus, a series of operating actions are performed successively as follows:

(1) Holder 26 advanced to loading position.
(2) Vertical unit 20 operated to drop finished article 15 on core pin 18 into holder.
(3) Holder 26 returned to normal position.
(4) Return vertical unit to normal position.
(5) Advance front unit 28 to feeding position.
(6) Advance holder 26 to feed leading end of core pin into article 16 of unit 28.
(7) Return holder 26 to normal position.
(8) Return front unit 28 to normal position.
(9) Advance unit 57 to position collet 58 open in loading position.
(10) Advance holder to loading position to locate end of core pin in collet 58.
(11) Close collet.
(12) Return holder 26 to normal position removing finished article from core pin.
(13) Index turret to locate tool 48 in operating position.
(14) Advance back unit 30 to locate part 17 in loading position.
(15) Advance tool 48 to push part 17 on core pin 18.
(16) Return tool 48 to normal position.
(17) Index turret to locate holder in operating position.
(18) Return back unit 30 to normal position.
(19) Open collet to release core pin 18 and parts 16 and 17.

These operating actions are carried out in the manner described above to avoid disturbance of one unit with the other units and to locate them in the loading positions in their respective order so that the various operations may be performed smoothly to receive the finished article on the core pin in the holder 26 and eventually cause removal of the finished article from the core pin and recondition the core pin with the mounting of the parts 16 and 17 thereon for the molding step, that is, the molding of the article or germanium varistor thereon.

It should be understood also that, if desired, the contour of the portion 68 of the holder 26 may be varied to cause the entire pressure applied in the step illustrated in FIG. 4 to the core pin to actually move the finished article 15 a given distance to the right on the core pin during mounting of the article 16 thereon so that the article 16 may be located at its preferred position rather than utilizing subsequent means for the final location of the part 16 on the core pin.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for stripping molded articles from core pins and reloading the core pins with hollow parts for molding of articles including the parts on the core pins, the apparatus comprising a holder adapted to receive successive molded articles on core pins, a carriage to support the holder, means to support the carriage for reciprocation between a normal position and a loading position, means to feed the molded articles on their core pins singly to the holder at one interval when the holder is in the loading position, a unit adapted to carry first hollow parts movable relative to the carriage to align a first hollow part with the core pin and cause it to be mounted on a first end of the core pin during the next movement of the holder into the loading position, a collet actuable to grip the first end of the core pin carrying the first part, means to support the collet for movement into engagement with the first end of the core pin when the holder is located in the loading position, means mounted on the holder to remove the molded article from the gripped core pin during movement of the holder to its normal position, a unit actuable to align a second hollow part with a second end of the gripped core pin, and means operable to move the second part onto the second end of the core pin.

2. An apparatus according to claim 1 in which the holder has a pocket to receive the molded article on its core pin and hold it with the core pin aligned with but spaced from the first hollow part when the holder is in the normal position, and a backing member supported by the carriage and extending into the pocket of the holder to engage the core pin of the article and force the first end of the core pin into the first hollow part.

3. An apparatus according to claim 2 in which the means mounted on the holder to remove the molded article from the core pin includes an element mounted on the holder at an end of the pocket adjacent the mounted first hollow member and having a notch to receive the core pin and to close said end of the pocket against escapement of the molded article.

4. An apparatus according to claim 1 in which the unit for the first parts includes a hopper for the first parts, a chute directing the first parts in predetermined stacked formation from the hopper, and a transporting element mounted for movement relative to the chute to move a first part to locate the first part in alignment with the first end of the core pin.

5. An apparatus according to claim 4 in which the transporting element has an aperture therein to receive the first end of the core pin, and a member fixed to the transporting element and positioned to hold the first part against movement during movement of the core pin into the first part.

6. An apparatus according to claim 1 in which the unit for the second hollow part includes a chute directing the second hollow parts in predetermined stacked formation to a receiving position, and a transfer element mounted for movement relative to the chute and having an aperture to locate a second part in alignment with the second end of the core pin and to guide the second part onto the second end of the core pin.

7. An apparatus according to claim 6 in which a second part loading tool is mounted on the carriage, and means to position the carriage on its support to locate the tool in alignment with the core pin and second part held by the transfer element, said tool being adapted to push the second part through the aperture in the transfer element and onto the core pin during movement of the carriage into its loading position.

References Cited in the file of this patent

UNITED STATES PATENTS

| | | |
|---|---|---|
| 270,716 | Wohnlich | Jan. 16, 1883 |
| 296,895 | Tucker | Apr. 15, 1884 |
| 2,604,658 | Broden | July 29, 1952 |
| 2,825,126 | Legat | Mar. 4, 1958 |
| 2,841,937 | Miskel | July 8, 1958 |